United States Patent [19]

Duke

[11] Patent Number: 5,038,510

[45] Date of Patent: Aug. 13, 1991

[54] QUICK CONNECT/DISCONNECT BOW FISHING

[76] Inventor: Douglas Duke, 7010 Ficken Rd., Cedar Hill, Mo. 63016

[21] Appl. No.: 601,223

[22] Filed: Oct. 22, 1990

[51] Int. Cl.⁵ ............................................. A01K 00/00
[52] U.S. Cl. ................................................ 43/4; 43/19; 124/86; 124/88
[58] Field of Search .................... 43/1, 4, 19; 403/324, 403/328, 330; 124/86, 88

[56] References Cited

U.S. PATENT DOCUMENTS

| | | | |
|---|---|---|---|
| 353,218 | 11/1886 | Harrington | 403/324 X |
| 1,954,048 | 4/1934 | Jeffrey et al. | 403/330 X |
| 2,090,731 | 8/1937 | Klein | 124/69 |
| 2,267,065 | 12/1941 | Wilen | 43/6 |
| 2,796,691 | 6/1957 | Norris | 43/6 |
| 2,839,862 | 6/1958 | Hanshaw | 43/6 |
| 3,015,182 | 1/1962 | Tuttle et al. | 43/19 |
| 3,419,991 | 1/1969 | Mitchell | 43/19 |
| 3,614,947 | 10/1971 | Feldman | 124/20.3 |
| 3,949,730 | 4/1976 | Schoenberger | 43/19 X |
| 4,309,974 | 1/1982 | Carter et al. | 124/23.1 |
| 4,466,417 | 8/1984 | Mulot et al. | 124/25 |
| 4,744,347 | 5/1988 | Dodge | 124/86 |
| 4,773,179 | 9/1988 | Corley | 43/19 |
| 4,974,575 | 12/1990 | Mitchell | 124/88 |

OTHER PUBLICATIONS

"Converta-Rod Adapter", advertisement from *Bow & Arrow*, Apr. 1987, p. 31.

Primary Examiner—Richard K. Seidel
Assistant Examiner—Patty E. Hong
Attorney, Agent, or Firm—Robbins & Robbins

[57] ABSTRACT

A quick release bow fishing device is provided. The device allows for a quick connect and disconnect of a fishing rod and reel from an archery bow. The device is comprised of a connecting shaft that attaches to the bow at the socket conventionally employed for a stabilizer attachment. The fishing rod is provided with a longitudinally bored channel within the handle to receive the shaft. The shaft is constructed so that trigger catch means engage the shaft to restrict relative motion of the shaft within the channel thus holding the bow and rod together. The trigger catch release is located on the handle for easy manipulation by the operator to effect a release of the shaft for a quick disconnect of the rod from the bow. Another embodiment of the device is provided with the shaft having radial arms to engage retaining slots in the rod handle.

8 Claims, 4 Drawing Sheets

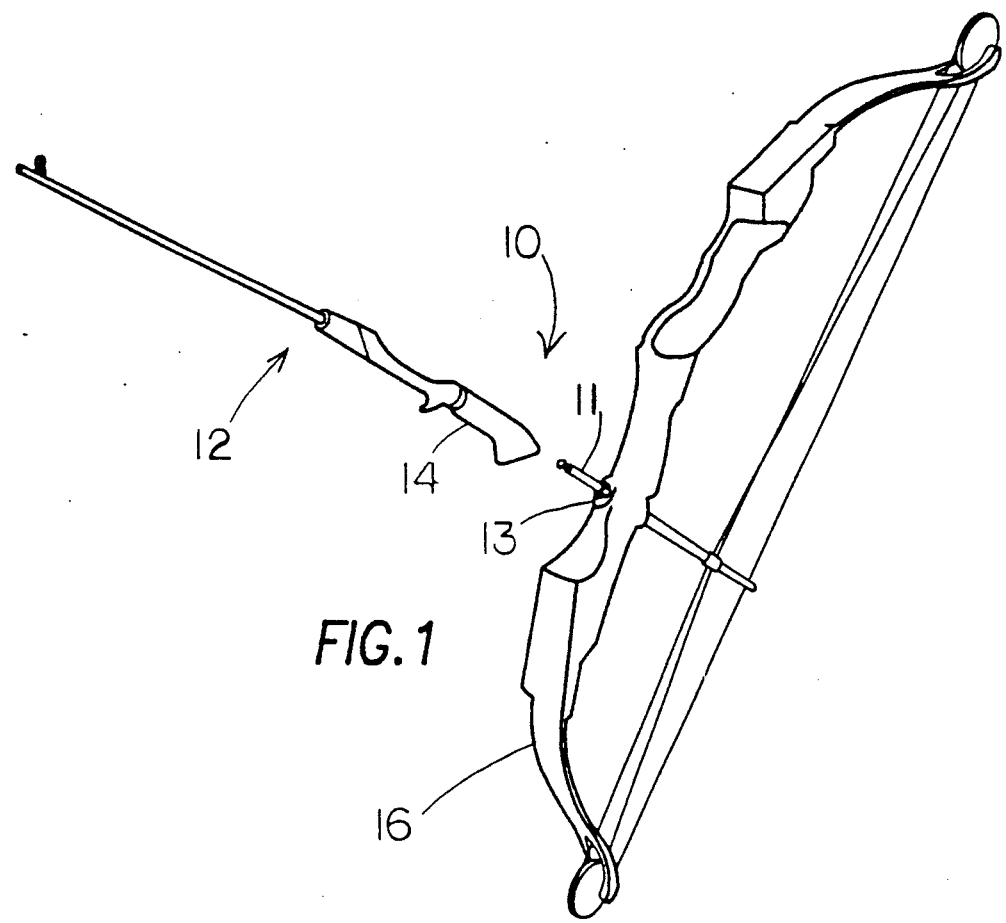
FIG.1
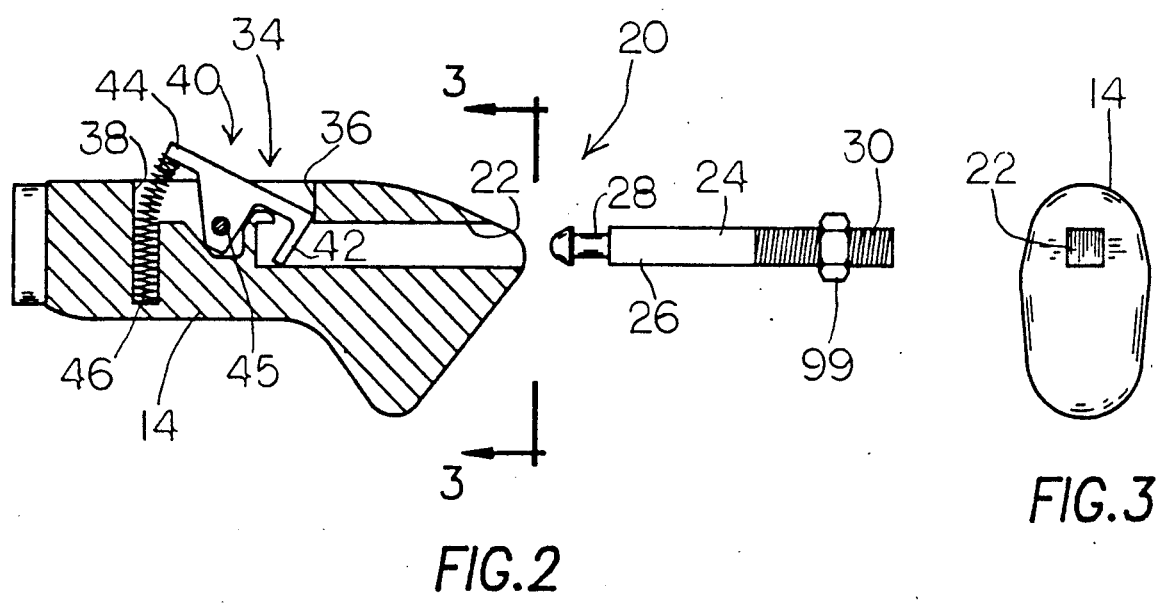
FIG.2
FIG.3

QUICK CONNECT/DISCONNECT BOW FISHING

BACKGROUND OF THE INVENTION

The present invention relates to a device for attaching a fishing rod to an archery bow.

Bow fishing is a sport that combines the skills of archery and fishing. The necessary equipment, however, does not readily lend itself to simultaneous use. Both the bow and the rod and reel require full attention by the operator during their respective uses. One can not shoot his bow while grasping the rod, nor can one effectively reel in a fish while holding the bow.

Devices have been provided whereby a fishing rod can be attached to a bow so that the while the bow is being shot, the rod is within easy reach. In the event that a fish is to be reeled in, one may merely reach forward to grab the rod. The problem of handling the bow while reeling in the catch, however, still exists. The handle of the rod is attached to the bow making it quite cumbersome to manipulate the rod.

Accordingly, there is a distinct need for a device which will allow a fishing rod and reel to be connected to a bow as is used for bowfishing which provides for quick connect and disconnect of the rod from the bow so that unimpeded reeling in of the catch may proceed.

SUMMARY OF THE INVENTION

By means of the instant invention there has been provided a device by which the rod and reel may be quickly connected and disconnected from the bow as intended for use in bowfishing. The device comprises a connecting shaft threaded at one end which is received in the threaded socket that is conventionally positioned on the front face of the bow normally adapted for use with a stabilizer attachment. The handle of the fishing rod is provided with a longitudinally bored internal channel which receives the forward projecting shaft to effect connection of the rod to the bow. The shaft is constructed to engage catch means to control relative movement of the shaft within the internal channel. The catch means are partially disposed within the channel and external of the handle in the form of a trigger or button release to allow the operator to easily effect a quick disconnect of the rod from the bow.

Another embodiment of the invention provides for radial arms on the shaft which engage retaining slots within the rod handle. The internal channel of the rod contains a spring which urges the shaft arms against the retaining slots. Quick disconnect of the rod from the bow here is effected by rotation of the rod handle thus disengaging the shaft arms from the retaining slots.

It is therefore an object of this invention to provide means for a quick connect and disconnect of a fishing rod and reel to an archery bow as can be used for bowfishing.

The above features are objects of this invention. Further objects will appear in the detailed description which follows and will be otherwise apparent to those skilled in the art.

For purpose of illustration of this invention, preferred embodiments are shown and described hereinbelow in the accompanying drawings. It is to be understood that this is for the purpose of example only and that the invention is not limited thereto.

IN THE DRAWINGS

FIG. 1 is a perspective view of the invention showing the shaft of the quick release device as attached to a bow and ready to accept the handle of the fishing rod.

FIG. 2 is a view in side elevation from the side of the rod handle, partly in cross section, with the shaft of the quick release device of the first embodiment completely disengaged.

FIG. 3 is an end view of the rod handle of FIG. 2 taken along line 3—3.

DESCRIPTION OF THE INVENTION

Figure 4:
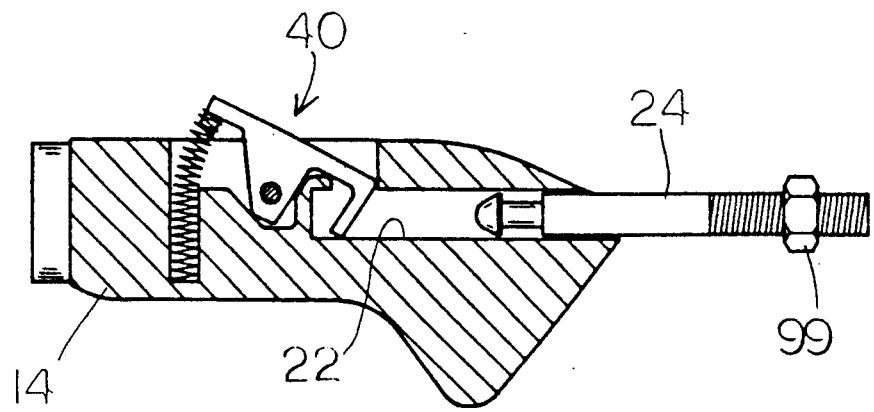
FIG. 4 is a view in side elevation from the side of the rod handle, partly in cross section, with the shaft being received within the rod handle.
Figure 5:
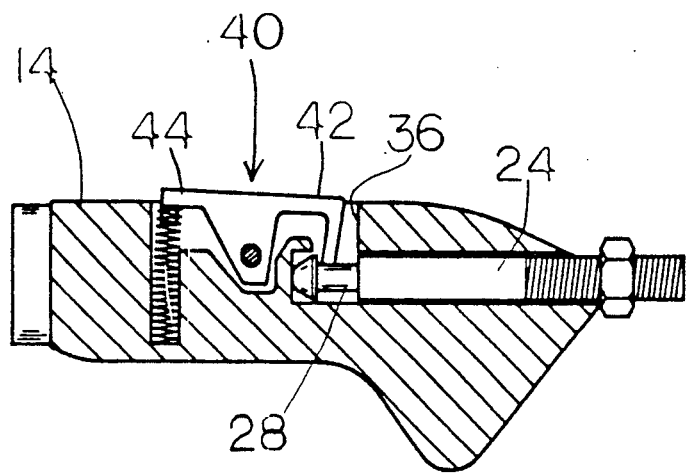
FIG. 5 is a view in side elevation from the side, partly in cross section, showing the shaft locked into position within the handle.

The quick connect/disconnect bow fishing rod device of the instant invention is generally indicated by the reference numeral 10 as shown in FIG. 1. It is generally comprised of a metal connecting shaft 11, threaded at one end to be received and secured in a threaded socket 13 normally provided in standard archery bows, a fishing rod 12 having a internally bored handle 14 which receives the shaft. It enables fishing rod 12 to be connected by its handle 14 to a bow 16 in quick connect and disconnect fashion. Three different embodiments of the quick connect device are provided. In all of the Figures, the reel is not shown. It is understood that the reel is of a type conventionally used with rods, and forms no part of the invention per se.

The first embodiment 20 is shown in FIGS. 2 through 5. A longitudinal channel 22 is bored into the handle 14 and has dimensions sufficient to receive shaft 24. In this embodiment, the shaft body 26 may be either tubular or rectangular shaped, with channel 22 being correspondingly shaped to receive shaft 24. FIG. 3 shows channel 22 as having a rectangular opening for receiving a rectangular shaft. Shaft body 26 has a notch 28 at its forward end, and is threaded at its back end 30. The back end 30 of the shaft is received by the threaded socket 13 which is conventionally found on the front of the bow for receiving stabilizer attachments as shown in FIG. 1.

A recess 34 is provided in the top of handle 14 and has a rear portion 36 which depends into channel 22, and a front well portion 38. Thumb trigger means 40 having a rear catch member 42 and a front member 44 is pivotally received by pivot pin 45 within recess 34. Front member 44 is connected to and upwardly urged by spring 46 disposed within front well portion 38 whereby rear catch member 42 pivots and projects into channel 22. As shaft 24 is introduced into channel 22 in FIG. 4, front member 44 is depressed which lifts rear catch member 42 out of channel 22 a distance sufficient to allow shaft body 26 to pass and be fully inserted within the channel. Notch 28 of the shaft is aligned with rear portion 36 of the recess when fully inserted. Thumb trigger 40 is released to allow rear catch member 42 to engage notch 28 in detentive fashion thus retaining shaft 24 as in FIG. 5. Release of shaft 24 is effected by depression of front member 44 of the thumb trigger which lifts rear catch member 42 out of retaining relationship with notch 28.

Figure 6:
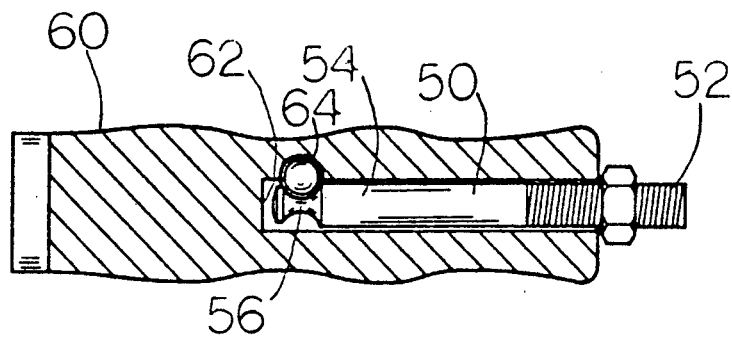
FIG. 6 is a top plan view, partly in cross section, of the second embodiment of the invention showing the shaft locked into position within the handle.
Figure 8:
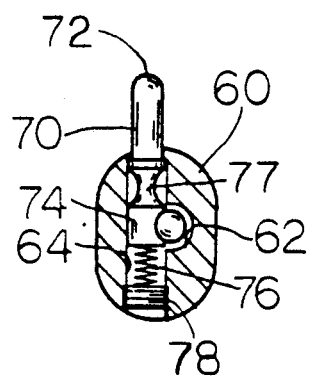
FIG. 8 is a view in side elevation from the front taken along line 8—8 of FIG. 7.
Figure 7:
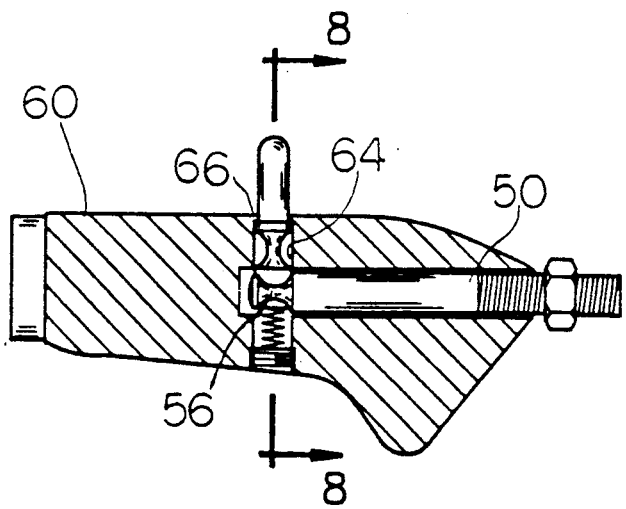
FIG. 7 is a view in side elevation from the side, partly in cross section, showing the shaft locked into position.
Figure 9:
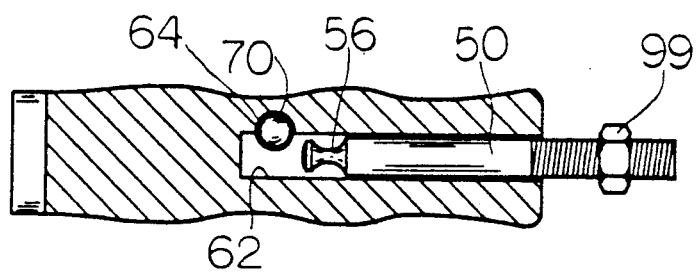
FIG. 9 is a top plan view, partly in cross section, showing the shaft as disconnected.

The second embodiment is shown in FIGS. 6 through 11. Shaft 50 has threaded end 52 for securing to the threaded socket of the bow, and forward end 54 having a depressed area 56 of reduced diameter. Area 56 may be a depression in one side of shaft 50 or may be present over the entire circumference at that point. Rod handle 60 has a longitudinally bored internal channel 62, as in the first embodiment, for receiving shaft 50. A tubular hole 64 runs perpendicularly to internal channel 62, and is slightly offset from center so that it opens into channel 62 but only partially overlaps it as seen in FIGS. 6 and 7. Tubular hole 64 may be drilled from top to bottom or from side to side. One end of hole 64 is of slightly lesser diameter to form a retaining shelf 66 and the other end may be threaded to receive a set screw 78 or the like.

A plunger 70 is disposed in hole 64 such that a top button portion 72 protrudes out of hole 64 and bottom portion 74 is slidably received within hole 64. Top portion 72 is of slightly lesser diameter than the rest of plunger 70 so that it may protrude out of the tubular hole while the remainder of plunger 70 is retained by shelf 66 to prevent plunger 70 from falling out of hole 64. Spring means 76 is inserted under plunger 70 and is retained within hole 64 by set screw 78.

Figure 11:
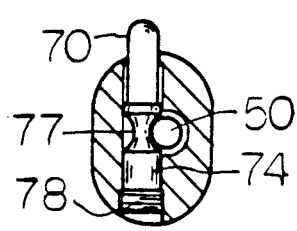
FIG. 11 is a view, in side elevation from the front taken along line 11—11 of FIG. 10.
Figure 10:
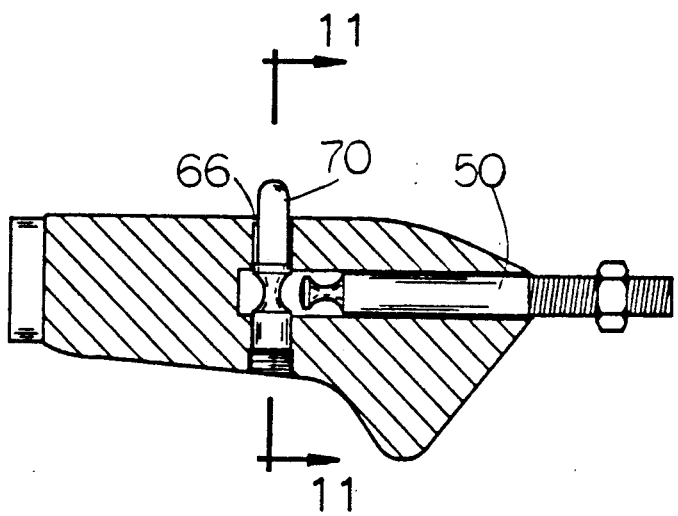
FIG. 10 is a view in side elevation from the side, partly in cross section, showing the shaft as disconnected.

Spring means 76 urges bottom portion 74 of plunger 70 upward so that it partially enters channel 62 as seen in FIG. 7. As shaft 50 is fully inserted within the channel, the reduced diameter area 56 is positioned such that it is in alignment with hole 64. Bottom portion 74 of the plunger and area 56 of the shaft thus engage, retaining the shaft in a locked position. To effect disengagement, top button portion 72 is depressed, causing bottom portion 74 to slide out of detent relation with shaft area 56. Reduced diameter area 77 of plunger 70 is brought into channel 62 and into alignment with shaft area 56 as seen in FIG. 11. The diameter of area 77 is such to allow shaft 50 to pass unimpeded out of channel 62.

Figure 12:
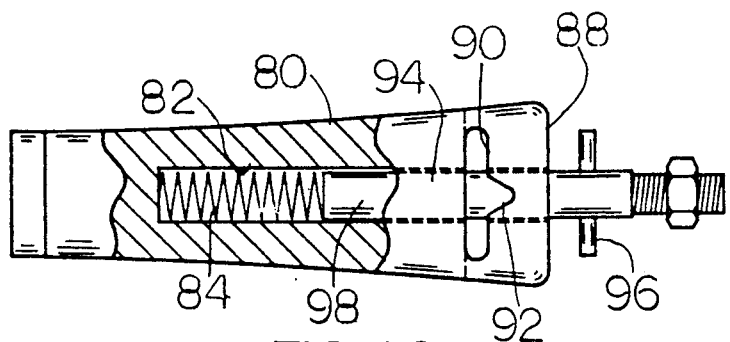
FIG. 12 is a view of the third embodiment of the invention in side elevation from the side, partly in cross section, showing the shaft being partially inserted into the rod handle.
Figure 13:
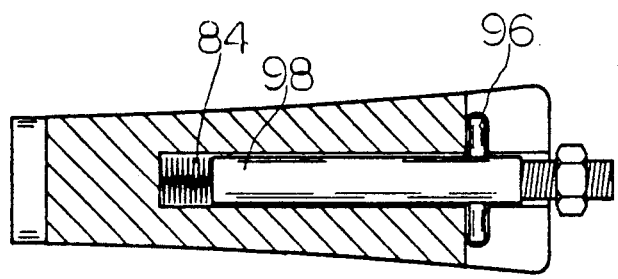
FIG. 13 is a view in side elevation from the side, partly in cross section, showing the shaft fully inserted into the handle.
Figure 14:
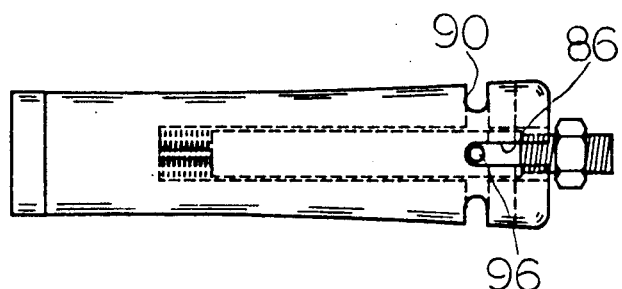
FIG. 14 is a top plan view, partly in cross section, showing the shaft fully inserted into the handle.
Figure 15:
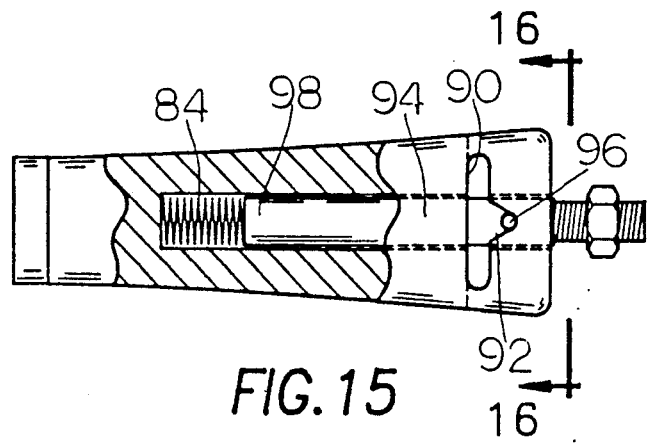
FIG. 15 is a view in side elevation from the side, partly in cross section, showing the shaft connected to and fully seated within the handle.
Figure 16:
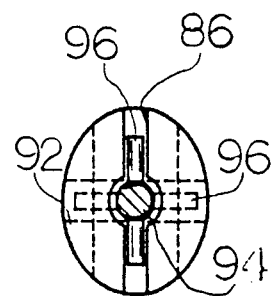
FIG. 16 is an end view taken along line 16—16 of FIG. 15 showing the arms of the shaft in dashed lines as introduced into the channel, and the arms after rotation in solid lines.

The third embodiment is shown in FIGS. 12 through 16. Rod handle 80 has a longitudinally bored channel 82 similar to those of the other embodiments. Spring means 84 is disposed within channel 82 at the interior end thereof as shown in FIG. 12. The end of handle 80 has a diametrically disposed slot 86 as seen in FIG. 16 which extends a slight distance down the length of the handle and is in communication with channel 82. Slot 86 may completely span the face of handle end 88 or may only partially span it. At least one lateral slot or groove 90 is cut into the side of handle 80 a short distance from the end as shown in FIG. 15. A second lateral groove may be similarly positioned on the opposite side of handle 80. Grooves 90 are oriented in the same direction as slot 86 and are also in communication with channel 82. A recess 92 is provided in the side of groove 90 on its edge toward the end of handle 80.

Shaft 94 has a threaded end like those of the first two embodiments. It has at least one radial arm 96 extending therefrom at a location towards said threaded end, although the drawings show a pair of such radial arms. Shaft 94 is introduced into channel 82 of handle 80 by aligning radial arms 96 with slot 86 as shown in FIG. 16. Shaft 94 is inserted a sufficient distance so that radial arms 96 approach the point where slot 86, channel 82 and grooves 90 intersect, whereupon the shaft is rotated relative to the channel, bringing radial arms 96 into grooves 90. Front end 98 of shaft 94 is biasedly urged against spring means 84, causing shaft 94 to retract whereupon radial arms 96 nest into recesses 92 as shown in FIG. 15. Disengagement of shaft 94 is effected by bringing radial arms 96 out of nesting relationship from recesses 92 and rotating the shaft to bring the radial arms into alignment with slot 86 whereupon the shaft may be withdrawn from the handle 80 for quick release.

USE

The quick connect/disconnect bow fishing rod of the instant invention is very simply employed using a conventional archery bow having a threaded front socket normally provided for stabilizer attachments. As hereinabove explained, each of the three embodiments comprise an internally longitudinally bored handle for receiving in locking relationship the shaft threadedly affixed to the bow. The bow and the fishing rod are thus joined while the hunter/fisher pursues his prey.

When the user successfully strikes a fish, he may quickly disconnect the rod from the bow for ease in reeling in the catch. In the trigger release of the first embodiment, the user merely depresses the trigger 40 which releases the detent catch portion 42 from the shaft allowing the rod handle to be pulled off and away from the shaft and separated from the bow. Reattachment of the rod to the bow may be effected by performing the reverse steps, i.e., causing the shaft to be inserted into the rod handle, depressing trigger 40 to raise catch member 42 to allow the shaft to fully enter the channel, and thereafter releasing trigger 40, locking the shaft within the handle. The trigger means are shown in the drawings as being mounted in the top portion of the handle, but it is understood that the trigger means may be mounted on either side of the handle.

The second embodiment, as explained above, allows for connection and disconnection in a manner similar to the first embodiment by depressing plunger 70. It is understood also that the plunger may be positioned in either side of the handle as well as through the top.

The third embodiment is connected and disconnected using a pushing/pulling and twisting motion instead of trigger means. The rod handle is pulled over the shaft, aligning slot 86 with radial arms 96, and then rotated to bring the radial arms down into grooves 90. Spring means 84 urge the shaft backward where the radial arms rest in recess 92 of the grooves. Release is effected by pushing the shaft forward against the spring and rotating the radial arms out of the grooves and back into slot 86 where the shaft may be freely removed. It is understood that slot 86 and grooves 90 may be aligned vertically as an alternate design.

Each of the embodiments employ a nut 99 on the threaded end of the shaft which may be tightened against the end of the connected rod handle to provide a more secure attachment between bow and rod.

Various changes and modifications may be made within this invention as will be apparent to those skilled in the art. Such changes and modifications are within the scope and teaching of this invention as defined in the claims appended hereto.

What is claimed is:

1. A quick release bow fishing rod device comprising a fishing rod, a connecting shaft, and an archery bow, said shaft being threaded at one end thereof, said bow having a threaded socket on the front face thereof, said socket receiving said shaft in threaded engagement, said shaft projecting forward from said bow, said fishing rod having a handle through which is longitudinally disposed an internally bored channel, said channel having locking means for receiving the free end of said shaft within said channel in locking engagement whereby said fishing rod is attached to said bow, said locking means being manipulative for disengagement of said shaft whereby a quick release of said rod from said bow may be effected.

2. The quick release bow fishing rod device of claim 1 in which said locking means comprises said shaft having a depressed area towards said free end, said handle having means to restrict the relative movement of said shaft within said channel by which a detent member engages said shaft at said depressed area in locking relationship, said detent member being readily manipulative by an operator to disengage said detent member from said shaft whereby a quick disconnect of said rod from said bow may be effected.

3. The quick release bow fishing rod device of claim 1 in which said threaded shaft receives a lock nut, said lock nut being drawn tight against said attached fishing rod whereby said rod resists rotation about a longitudinal axis.

4. The quick release bow fishing rod device of claim 1 in which the walls of said internally bored channel define a rectangle and said shaft is rectangular in shape, whereby when said shaft and said channel engage, said shaft resists rotation about its longitudinal axis within said channel.

5. The quick release bow fishing rod device of claim 2 in which said depressed area of said shaft forms a notch, said detent member is a thumb trigger release member, comprising a central body portion, a rear catch member and a front trigger spring member, said central body portion being pivotally connected within said rod handle on a top part thereof, said rear catch member being disposed within said rod handle and partially within said channel, said rear catch member being engageable with said notch of said shaft when said shaft is fully inserted in said channel, said front trigger spring member being partially disposed within said handle and partially being disposed above the top surface of said handle, whereby depression of said front trigger spring member by the operator causes said rear catch member to disengage from said notch of said shaft, whereby said shaft may move relative to and out of said channel and said rod may be disconnected from said bow.

6. The quick release bow fishing rod device of claim 2 in which said detent member comprises a tubular member, said tubular member being slidably disposed within a second channel in said handle at a position transverse to and partially within said longitudinal channel, a first end of said tubular member being external of said handle, means being provided for retaining said tubular member within said second channel, a second end of said tubular member being biasedly urged against spring means within said second channel, said tubular member having a concave region between said first and second ends, said spring means urging said second end of said tubular member to adjacently engage and retain said shaft in locking relationship at said depressed area when said shaft is fully inserted in said longitudinal channel, said first end of said tubular member being manipulative by an operator by pushing down on said first end whereby said concave region of said tubular member may be slid into alignment with said depressed area of said shaft allowing said shaft to be released from said detent member and withdrawn from said longitudinal channel, whereby said rod may be quickly disconnected from said bow.

7. The quick release bow fishing rod device of claim 6 in which said second channel passes completely through said handle, said second channel having an opening of reduced diameter at one end thereof, said first end of said tubular member having a diameter less than said second end of said tubular member and less than said opening whereby said tubular member is restricted from exiting said second channel, said second channel further having a second opening, said second opening being threaded for receiving a threaded sealing member.

8. The quick release bow fishing rod device of claim 1 in which said locking means comprises spring means being contained within said longitudinal channel within said handle, said handle having a diametrically disposed slot at the end thereof and at least one lateral groove in one of the sides thereof, said slot intersecting the open end of said longitudinal channel, said lateral groove being positioned in said handle a short distance from said end and oriented in the same direction as said slot, said groove opening into said channel and said slot, said groove having a recessed area towards said end, said shaft having at least one radial arm member positioned towards said threaded end, whereby said shaft is introduced into said channel by aligning said radial arm with said slot and inserting said shaft into said channel and against said spring means a sufficient distance so that said radial arm may be rotated into said lateral groove, whereby said spring means urge said shaft backward and said radial arm into said recessed area in retaining relationship, said shaft being disengageable by urging said shaft forward and rotating said radial arm out of said recessed area and into said slot, whereby said shaft may be withdrawn from said handle.

* * * * *

UNITED STATES PATENT AND TRADEMARK OFFICE
CERTIFICATE OF CORRECTION

PATENT NO. : 5,038,510

DATED : August 13, 1991

INVENTOR(S) : Douglas Duke

It is certified that error appears in the above-identified patent and that said Letters Patent is hereby corrected as shown below:

On the title page, item [54] and in col. 1, line 1, the title should read --QUICK CONNECT/DISCONNECT BOW FISHING ROD--.

Signed and Sealed this

Twentieth Day of October, 1992

Attest:

DOUGLAS B. COMER

*Attesting Officer*     *Acting Commissioner of Patents and Trademarks*